United States Patent
Nakashima

(10) Patent No.: US 7,177,898 B2
(45) Date of Patent: Feb. 13, 2007

(54) MULTIPLE-PROCESSOR INFORMATION PROCESSING SYSTEM

(75) Inventor: Manabu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 823 days.

(21) Appl. No.: 09/800,941

(22) Filed: Mar. 7, 2001

(65) Prior Publication Data

US 2001/0023456 A1    Sep. 20, 2001

(30) Foreign Application Priority Data

Mar. 17, 2000 (JP) .............................. 2000-081672

(51) Int. Cl.
  *G06F 15/16* (2006.01)
(52) U.S. Cl. ............... 709/201; 709/238; 370/392; 370/254
(58) Field of Classification Search ............... 709/242, 709/238, 201, 243; 714/4; 370/392, 222, 370/25 H, 254
  See application file for complete search history.

(56) References Cited

U.S. PATENT DOCUMENTS

| | | | | |
|---|---|---|---|---|
| 5,917,997 A | * | 6/1999 | Bell et al. ...................... | 714/4 |
| 5,923,854 A | * | 7/1999 | Bell et al. ..................... | 709/243 |
| 5,930,236 A | * | 7/1999 | Havansi ....................... | 370/254 |
| 5,951,650 A | * | 9/1999 | Bell et al. .................... | 709/238 |
| 6,175,874 B1 | * | 1/2001 | Imai et al. ................... | 709/238 |
| 6,317,775 B1 | * | 11/2001 | Coile et al. .................. | 709/201 |
| 6,445,704 B1 | * | 9/2002 | Howes et al. ................ | 370/392 |
| 6,633,538 B1 | * | 10/2003 | Tanaka et al. ............... | 370/222 |
| 6,650,641 B1 | * | 11/2003 | Albert et al. ................ | 370/392 |
| 6,665,702 B1 | * | 12/2003 | Zisapel et al. .............. | 709/238 |

\* cited by examiner

*Primary Examiner*—William C. Vaughn, Jr.
*Assistant Examiner*—Thanh (Tammy) Nguyen
(74) *Attorney, Agent, or Firm*—Greer, Burns & Crain, Ltd.

(57) ABSTRACT

A multiple-processor information processing system is capable of reducing adverse influence of overload of a given communication process on other communication processes. In this multiple-processor information processing system, a virtual IP address definition section defines virtual IP addresses on a process module-by-processor module basis. A storage device stores the virtual IP addresses defined by the virtual IP address definition section and information indicative of ones of the processor modules corresponding to the virtual IP addresses, respectively, in a state correlated with each other. A notification section notifies a router of a virtual IP address of each processor module and a real IP address of the each process module as routing information, for each processor module having the virtual IP address stored in the storage device.

2 Claims, 10 Drawing Sheets

| PROCESSOR MODULE | REAL IP ADDRESS | VIRTUAL IP ADDRESS | DESTINATION IP ADDRESS |
|---|---|---|---|
| PM#1 | RIPA#1 | VIPA#1 | — |
| PM#2 | RIPA#2 | VIPA#1 | — |
| PM#3 | RIPA#3 | VIPA#2 | — |
| PM#4 | RIPA#4 | VIPA#2 | — |

FIG. 8

| DESTINATION IP ADDRESS | GATEWAY ADDRESS | METRIC |
|---|---|---|
| VIPA#1 | RIPA#1 | 2 |
| VIPA#1 | RIPA#2 | 2 |
| VIPA#2 | RIPA#3 | 2 |
| VIPA#2 | RIPA#4 | 2 |

FIG. 10

MULTIPLE-PROCESSOR INFORMATION PROCESSING SYSTEM

BACKGROUND OF THE INVENTION (1) Field of the Invention

This invention relates to a multiple-processor information processing system, and more particularly to a multiple-processor information processing system having a plurality of processor modules.

(2) Description of the Related Art

Conventionally, an information processing system having a plurality of processor modules (PMs) (hereinafter referred to as "the multiple-processor information processing system") carries out TCP/IP (Transmission Control Protocol/Internet Protocol) communication by two methods; a method of using a real IP address, and a method of employing a virtual IP address.

Here, the term "real IP address" is used to mean an IP address which corresponds to a communication medium of each PM, and is set on a PM-by-PM basis and on a communication medium-by-communication medium basis. On the other hand, the term "virtual IP address" is used to mean an IP address which the system can have independently of the PMs and the communication media, and appears to an adjacent IP router and a communication opposite party as if it were an address of a remote network/host system which exists beyond the real IP address which the multiple-processor information processing system has.

The use of a virtual IP address as described above enables the communication opposite party to carry out the TCP/IP communication without being conscious of the configuration of the PMs of the system and their communication media.

In the TCP/IP communication, since a virtual IP address appears to be an address of a remote network/host system, routing information can be transmitted to the adjacent IP router by using a RIP (Routing Information Protocol).

However, in the conventional multiple-processor information processing system, only one virtual IP address is assigned to all the PMs, so that when communication is carried out by using the virtual IP address, all the communication processes are allocated to all the PMs such that the number of connections is made uniform among the PMs, thereby balancing the load across the PMs. As a result, different communication processes can be assigned to one PM, and if a certain communication process is overloaded, it adversely affects the other communication processes.

Further, due to the increasingly widespread use of the Internet in recent years, such a system can sometimes experience concentrated access from a large indefinite number of users during a particular time of the day. If the system uses a virtual IP address in such a case, the processing load on all the PMs is temporarily increased, thereby suppressing execution of particular services necessitating prompt processing, causing the trouble in providing the services.

SUMMARY OF THE INVENTION

The present invention has been made in view of the above problems, and an object of the invention is to provide a multiple-processor information processing system which is capable of reducing adverse influence of overload of a predetermined communication process on other communication processes than the predetermined communication process, when the system uses a virtual IP address.

To attain the above object, the present invention provides a multiple-processor information processing system including a plurality of processor modules. This multiple-processor information processing system comprises virtual IP address definition means for defining virtual IP addresses on a processor module-by-processor module basis, storage means for storing virtual IP addresses defined by the virtual IP address definition means and information indicative of ones of the processor modules corresponding to the virtual IP addresses, respectively, in a state correlated with each other, and notification means for notifying a router of a virtual IP address of each processor module and a real IP address of the each process module as routing information, for the each processor module having the virtual IP address stored in the storage means.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a diagram illustrating an example of a data table stored in a communication control section appearing in FIG. 3;

FIG. 10 is a diagram illustrating an example of a data table stored in a router shown in FIG. 3.

DESCRIPTION OF THE PREFERRED EMBODIMENT

A preferred embodiment of the present invention will be described below with reference to accompanying drawings.

Figure 1:
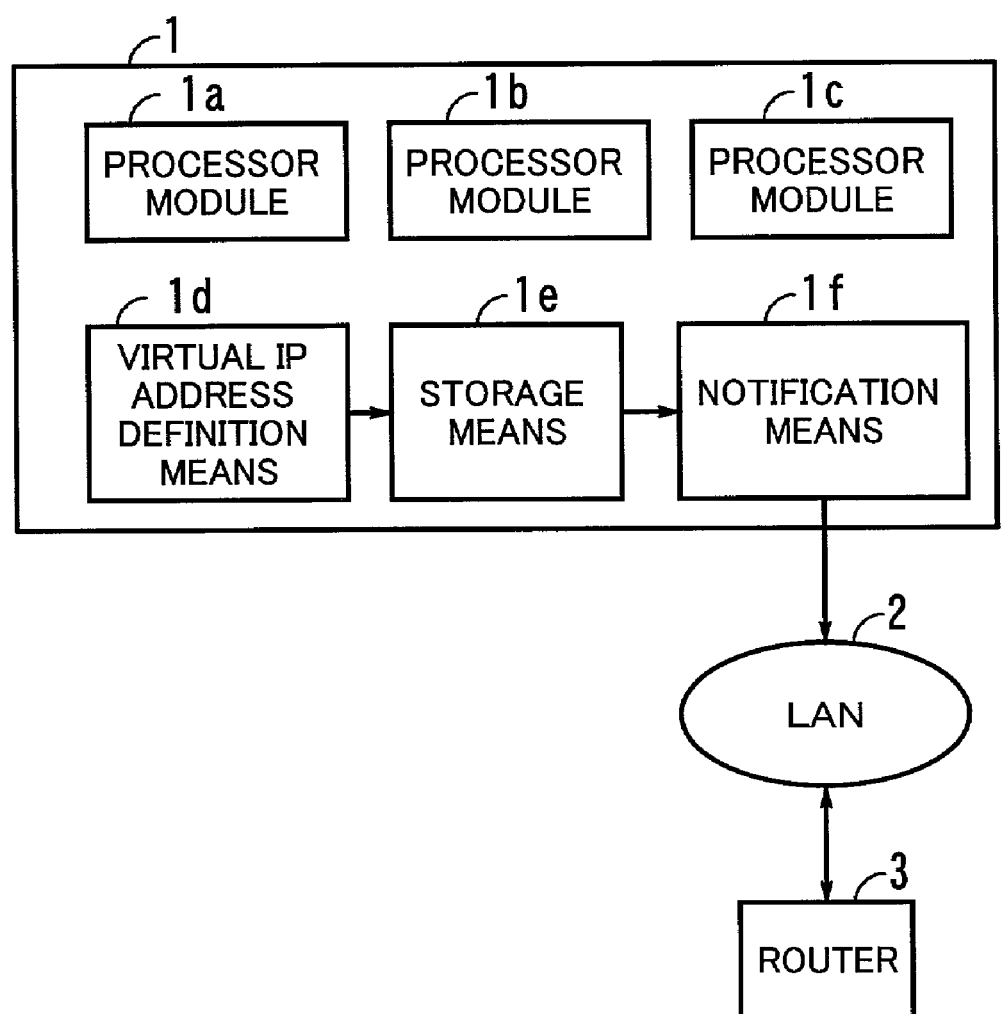
FIG. 1 is a diagram which is useful in explaining the operating principles of the present invention.

FIG. 1 is a diagram showing the operating principles of the present invention. As shown in the figure, the multiple-processor information processing system 1 according to the present invention is comprised of processor modules 1a to 1c, virtual IP address definition means 1d, storage means 1e, and notification means 1f, and is connected to a router 3 via a LAN (Local Area Network) 2.

Each of the processor modules 1a to 1c is comprised of a CPU (Central Processing Unit), a memory, and control devices, and carries out various operations according to programs read from a storage device, not shown.

The virtual IP address definition means 1d defines virtual IP address for processor modules on a processor module-by-processor module basis. It should be noted that inversely, the virtual IP address definition means 1d may be configured such that it defines processor modules for virtual IP addresses on a virtual IP address-by-virtual IP address basis.

The storage means 1e stores the virtual IP addresses defined by the virtual IP address definition means 1d and information of the processor modules in a manner correlated with each other.

The notification means 1f notifies the router 3 of the virtual IP address and a real IP address of each processor module (i.e. addresses assigned to the processor module) as routing information, for processor modules each having a virtual IP address assigned thereto and stored in the storage means 1e.

The LAN 2 connects the multiple-processor information processing system 1 and the router 3 to each other, thereby enabling data to be transmitted and received therebetween.

The router 3 is arranged at a node connecting a plurality of LANs to each other and determines an optimum route through which each packet should be forwarded, and sends the packet therethrough.

Next, the operations of the multiple-processor information processing system 1 based on the above operating principles will be described. It should be noted that the following description is made, by way of example, on a case in which a virtual IP address VIPA#1 is assigned to the processor module 1a and the processor module 1b, and a virtual IP address VIPA#2 is assigned to the processor module 1c.

The virtual IP address definition means 1d defines virtual IP addresses for processor modules on a processor module-by-processor module basis by data input from an entry device, not shown. In the present example, it is defined that the processor modules 1a and 1b have the virtual IP address VIPA#1, and the processor module 1c has the virtual IP address VIPA#2.

The storage means 1e refers to information defined by the virtual IP address definition means 1d, and stores information indicative of respective processor modules (e.g. numerical values "1" to "3" corresponding to the respective processor modules) and corresponding virtual IP addresses in a manner correlated with each other. In the present example, information indicative of the processor module 1a, information indicative of the processor module 1b, and information indicative of the processor module 1c are stored in a state associated with VIPA#1, VIPA#1, and VIPA#2, respectively.

For each processor module whose IP address is stored in the storage means 1e, the notification means 1f notifies the router 3 of the virtual IP address and the real IP address of the processor module. In the present example, all the processor modules have virtual IP addresses defined therefor, and assuming that the real IP addresses of the processor modules 1a to 1c are set to RIPA#1 to RIPA#3, respectively, the pairs of addresses of RIPA#1 and VIPA#1, RIPA#2 and VIPA#1, and RIPA#3 and VIPA#2 are transmitted, as routing information.

The router 3 carries out a normal routing process based on the supplied routing information. As a result, a packet having the virtual IP address VIPA#1 stored in a data portion of the packet is supplied to the processor module 1a and the processor module 1b. Further, a packet having the virtual IP address VIPA#3 stored in the data portion is supplied to the processor module 1c.

This makes it possible to assign the virtual IP address VIPA#1 to a type of information processing for services accessed by an indefinite large number of users, and the virtual IP address VIPA#2 to a type of information processing necessitating prompt execution, whereby services can be provided in a stable manner.

As described above, according to the present invention, virtual IP addresses are set on a processor module-by-processor module basis, and therefore communication processes can be allocated on a processor module-by-process module basis. As a result, when load on a specific type of communication process is increased, it is possible to prevent the increased load on the specific type of communication process from suppressing execution of other communication processes.

Next, a preferred embodiment of the present invention will be described.

Figure 2:
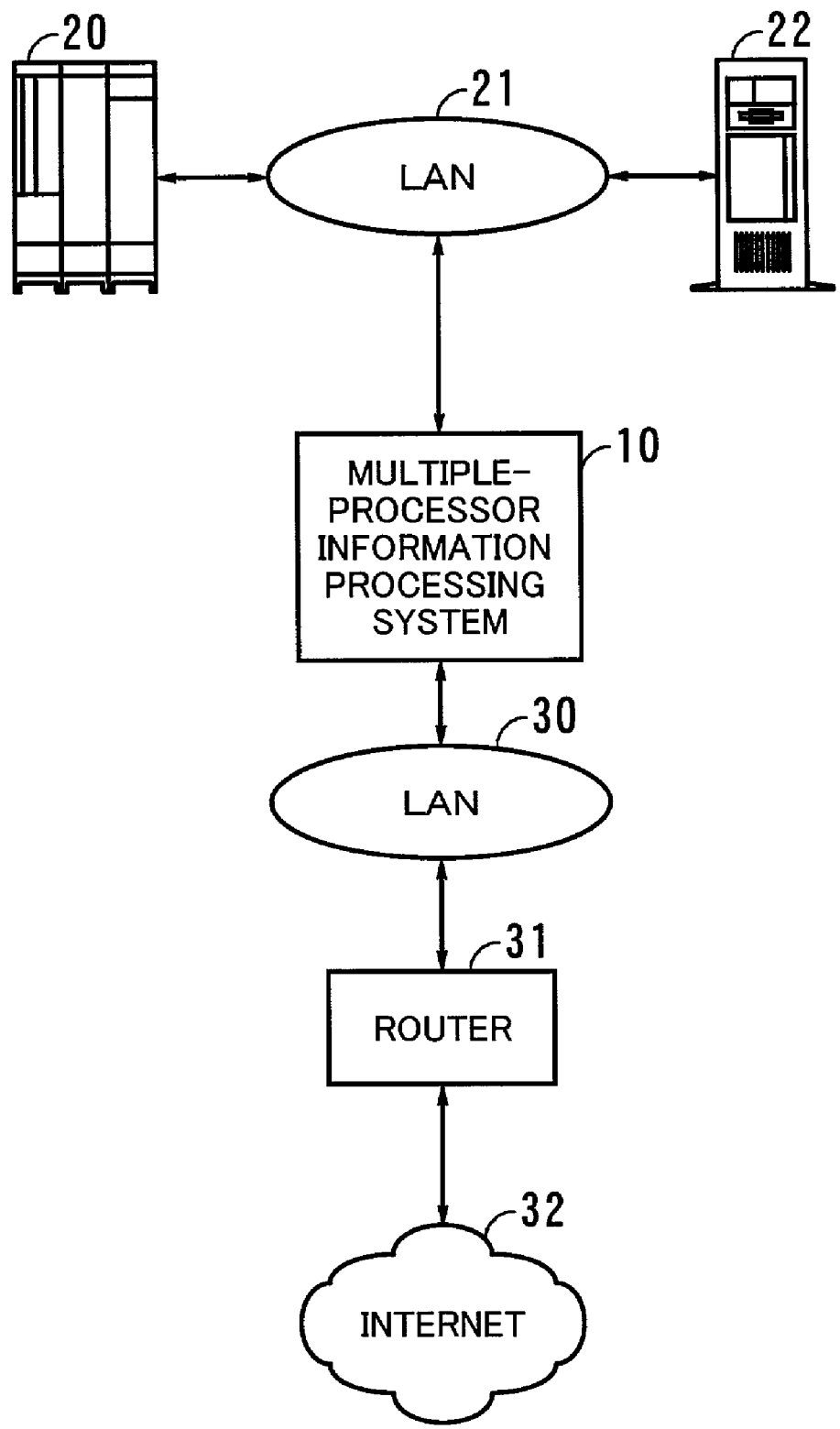
FIG. 2 is a diagram illustrating an example of the configuration of a preferred embodiment of the invention.

FIG. 2 shows an example of the preferred embodiment. As shown in the figure, a multiple-processor information processing system 10 is connected to servers 20 and 22 via a LAN 21, and further connected to the Internet 32 via a LAN 30 and a router 31. When a request is received from a user via the internet 32, the multiple-processor information processing system 10 provides processing (front end processing) for allowing the user to connect to an appropriate server.

The LAN 21 connects between the multiple-processor information processing system 10 and the servers 20 and 22, thereby enabling data to be transmitted and received therebetween.

The servers 20 and 22 offers services to clients, not shown, by way of the multiple-processor information processing system 10.

The LAN 30 connects the multiple-processor information processing system 10 and the router 31, thereby enabling data to be transmitted and received therebetween.

The router 31 determines an optimum route to forward each packet received, and sends the packet therethrough.

The Internet 32 is a worldwide communication network comprised of an aggregation of a lot of servers scattered all over the world.

Figure 3:
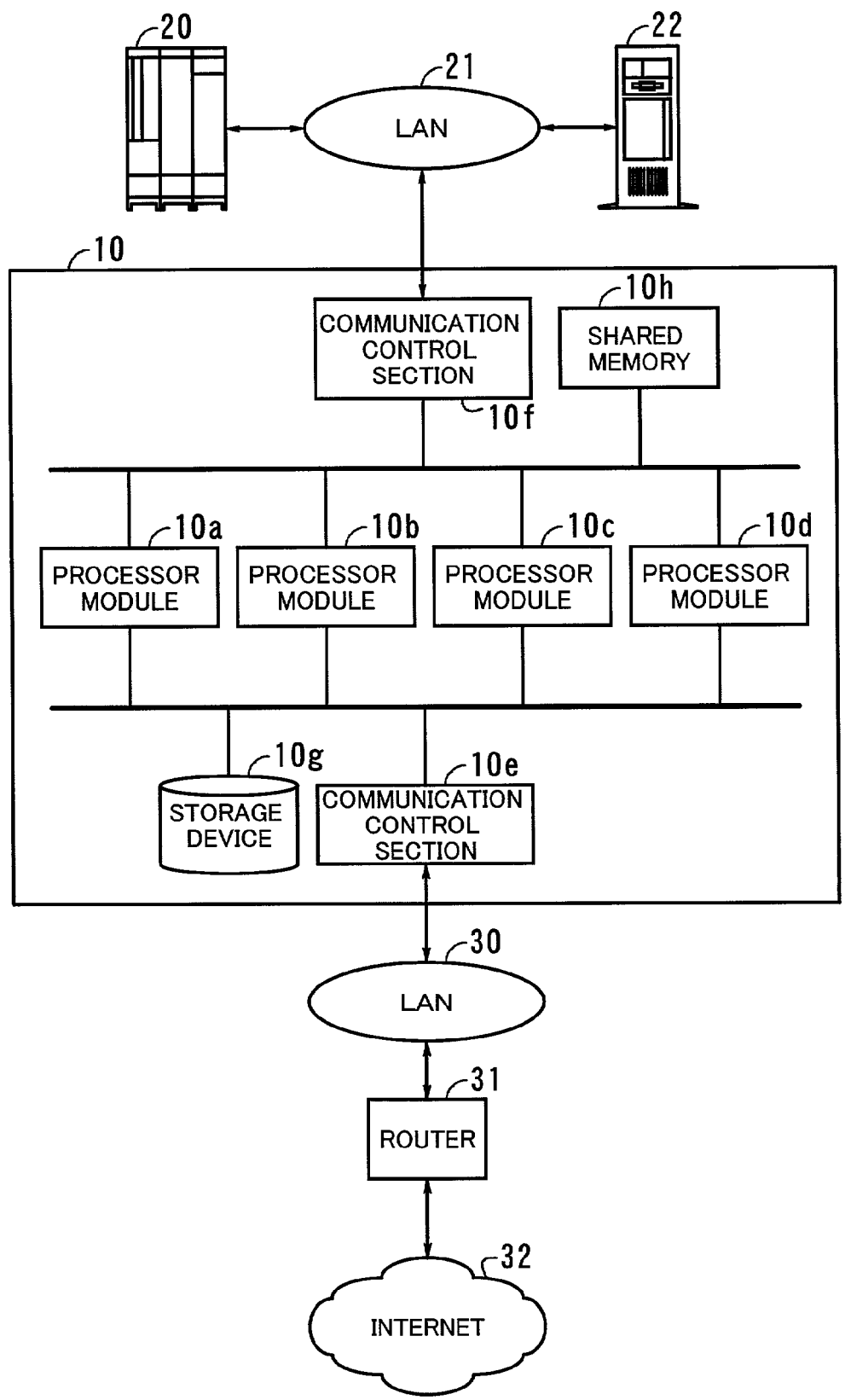
FIG. 3 is a diagram illustrating an example of the detailed construction of a multiple-processor information processing system shown in FIG. 2.

Next, the detailed construction of the multiple-processor information processing system 10 will be described by way of example with reference to FIG. 3.

As shown in the figure, this multiple-processor information processing system 10 is formed by processor modules 10a to 10d, communication control sections 10e and 10f, a storage device 10g, and a shared memory 10h.

The processor modules 10a to 10d are each comprised of a CPU (Central Processing Unit), a memory, control devices, etc., and carry out various operations according to programs read from the storage device 10g.

The communication control sections 10e and 10f carry out protocol conversions and the like when the processor modules 10a to 10d transmit and receive data to and from other systems. Further, these sections 10e and 10f may be mounted on the processor modules 10a to 10d.

The storage device 10g is formed by a magnetic storage device, and stores programs executed by the processor modules 10a to 10d, data, and the like.

The shared memory 10h is a memory the use of which is shared by the processor modules 10a to 10d, and is formed by a RAM (Random Access Memory), for instance.

Next, the operation of the above embodiment will be described hereinafter.

In the following, first, manners of assignment of virtual IP addresses, which can be effected by the present embodiment, and then the operation of the embodiment shown in FIG. 3 will be described.

FIGS. 4 to 7 are diagrams illustrating examples of the manner of assignment of virtual IP addresses according to the embodiment of the invention. It should be noted that the manners of IP address assignment shown in FIGS. 4 and 7 can be carried out by the conventional systems as well.

Figure 4:
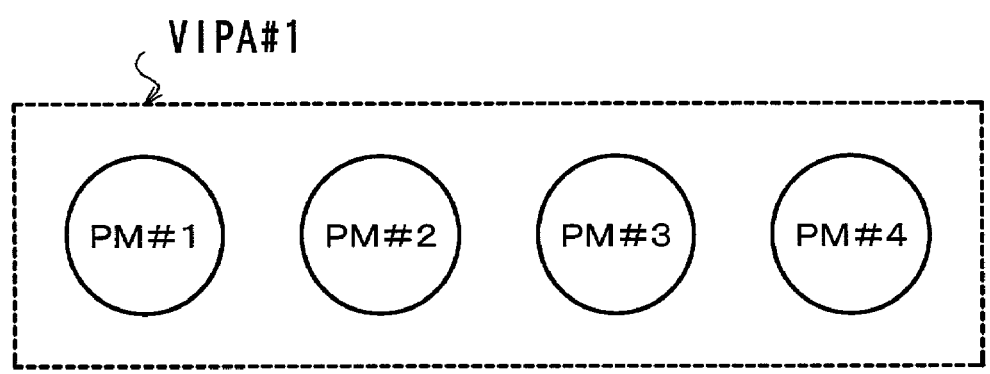
FIG. 4 is a diagram illustrating a manner of virtual IP address assignment to processor modules.

In an example shown in FIG. 4, the same virtual IP address is assigned to all the processor modules. More specifically, the single virtual IP address, VIPA#1, is assigned to all the processor modules PM#1 to PM#4. Here, the processor modules PM#1 to PM#4 correspond to the processor modules 10a to 10d, respectively.

Figure 5:
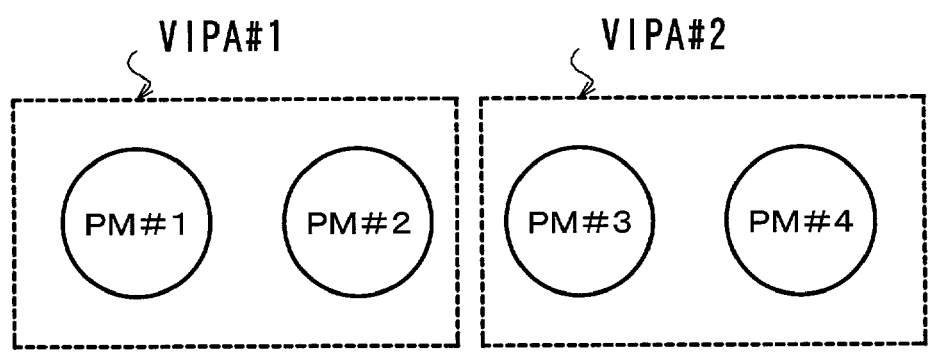
FIG. 5 is a diagram illustrating a manner of virtual IP address assignment to processor modules.

In an example shown in FIG. 5, the virtual IP address VIPA#1 is assigned to the processor modules PM#1 and PM#2, while the virtual IP address VIPA#2 is assigned to the processor modules PM#3 and PM#4.

Figure 6:
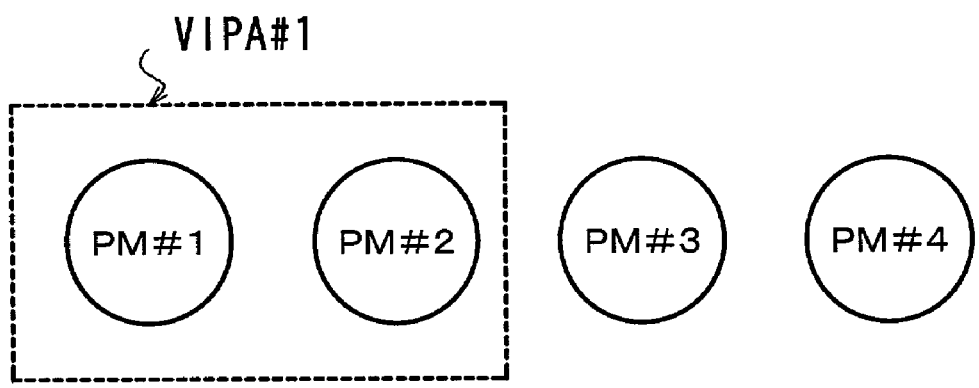
FIG. 6 is a diagram illustrating a manner of virtual IP address assignment to processor modules.

In an example shown in FIG. 6, the virtual IP address VIPA#1 is assigned to the processor modules PM#1 and PM#2, whereas no virtual IP address is assigned to the processor modules PM#3 and PM#4.

Figure 7:
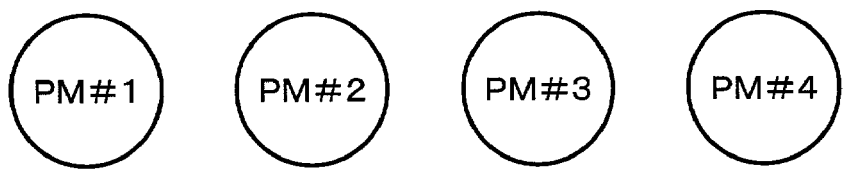
FIG. 7 is a diagram illustrating a manner of virtual IP address assignment to processor modules.

In an example shown in FIG. 7, no virtual IP address is assigned to any of the processor modules PM#1 to PM#4.

As described above, in the present embodiment, assignment of virtual IP addresses can be defined for the processor modules PM#1 to PM#4 on a processor module-by-processor module basis, so that it is possible to determine assignment of a virtual IP address to a processor module depending on the type of a communication process, thereby realizing optimum distribution of loads on the processors.

More specifically, e.g. in the FIG. 4 example, it is possible to cause all the processors to equally share load of the communication processes.

In the FIG. 5 example, by assigning virtual IP addresses on a process-by-process basis, it is possible to assign processor modules to the processes, on a process-by-process basis. For instance, it becomes possible to assign the virtual IP address VIPA#1 to processes demanded by ordinary users and assign the virtual IP address VIPA#2 to those demanded by important customers.

In the FIG. 6 example, for instance, the virtual IP address VIPA#1 can be assigned to processes related to Internet Protocol, and the processor modules PM#3 and PM#4 other than the processor modules PM#1 and PM#2 assigned with the virtual IP address VIPA#1 can be assigned to processes related to other protocols, e.g. OSI (Open Systems Interconnection). Thus, by making the processor modules specialized on a protocol-by-protocol basis, the speed of the communication processing can be enhanced.

In the FIG. 7 example, similarly to the case of the conventional systems, it is possible to cause each communication process to be assigned on a processor module-by-processor module basis, or cause the load of the communication processes to be equally shared by all the processor modules.

Next, the detailed operation of the embodiment shown in FIG. 3 will be described based on the FIG. 5 example in which virtual IP addresses are used in a divided manner.

FIG. 8 shows a data table stored in the communication control section 10e, which defines correlation between the real IP addresses, virtual IP addresses, and destination IP addresses, assigned to the respective processor modules. Here, the term "destination IP address" is used to mean an IP address which is given to a device or a network adjacent to a processor module when a virtual IP address is not assigned to the processor module. This example of data table does not contain any destination IP address since all the processor modules are assigned with the virtual IP addresses.

As shown in the figure, the processor module PM#1 is assigned with the real IP address RIPA#1 and the virtual IP address VIPA#1, but not with a destination IP address. The processor module PM#2 is assigned with the real IP address RIPA#2 and the virtual IP address VIPA#1, but not with a destination IP address. The processor module PM#3 is assigned with the real IP address RIPA#3 and the virtual IP address VIPA#2, but not with a destination IP address. Further, the processor module PM#4 is assigned with the real IP address RIPA#4 and the virtual IP address VIPA#2, but not with a destination IP address. It should be noted that such definition information is set by manually operating a terminal device, not shown.

Figure 9:
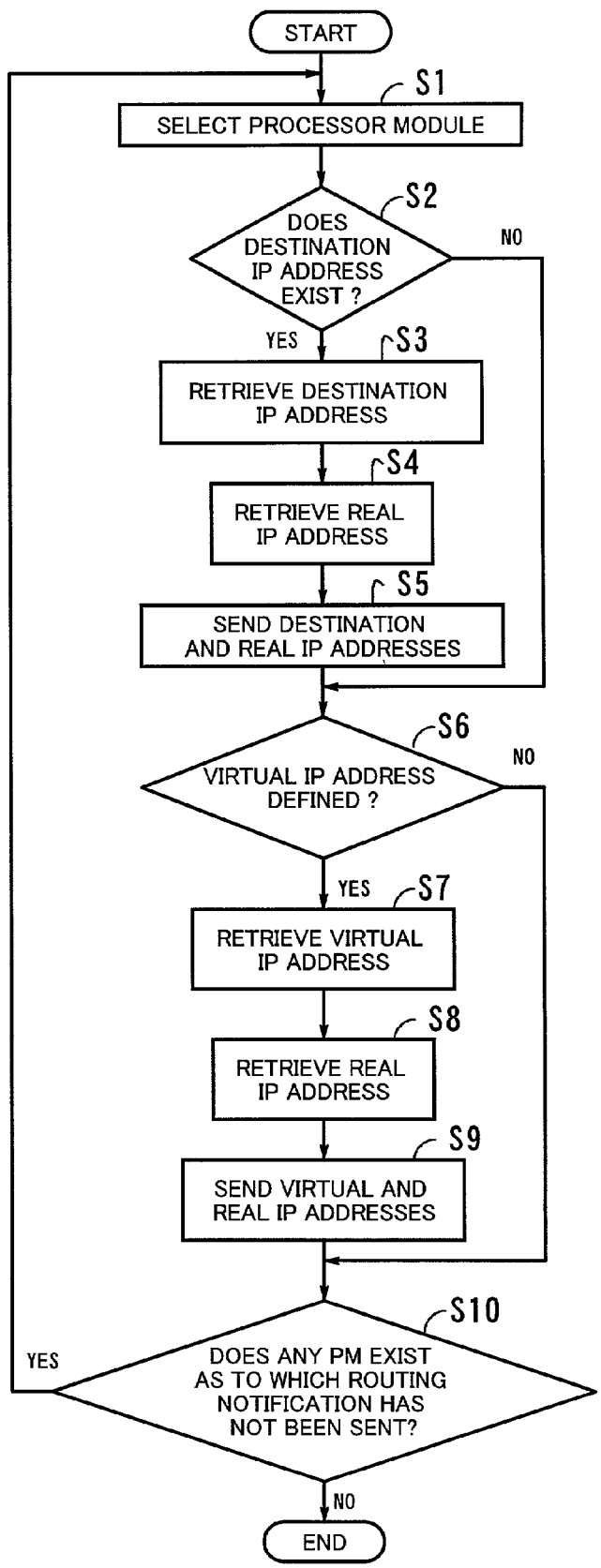
FIG. 9 is a flowchart which is useful in explaining an example of a process carried out by the multiple-processor information processing system shown in FIG. 3.

The communication control section 10e looks up the data table for routing information, and sends the retrieved routing information to the router 31 adjacent thereto. FIG. 9 is a flowchart which is useful in explaining a process carried out by the multiple-processor information processing system 10 when the system 10 sends routing information to the router 31. The process shown in this flowchart is executed e.g. every 30 seconds, and when it is started, there are carried out the following steps:

[S1] The communication control section 10e selects a processor module having been not selected yet.

[S2] The communication control section 10e determines with reference to the data table shown in FIG. 8 whether or not the selected processor module has a destination IP address. If the processor module has a destination IP address, the program proceeds to a step S3, whereas if not, the program proceeds to a step S6.

It should be noted that the fact that the processor module has a destination IP address implies that a virtual IP address is not assigned to the processor module.

[S3] The communication control section 10e retrieves the destination IP address from the FIG. 8 data table.

[S4] The communication control section 10e retrieves the real IP address from the FIG. 8 data table.

[S5] The communication control section 10e notifies the router 31 of the retrieved real IP address and destination IP address.

More specifically, the real IP address is recorded in a source address in the header portion of a packet, and the destination IP address is recorded in the data portion of the same, and the packet is sent to the router 31, for notification.

[S6] The communication control section 10e looks up the data table shown in FIG. 8, and determines whether or not the selected processor module is assigned with a virtual IP address. If the processor module has a virtual IP address assigned thereto, the program proceeds to a step S7, whereas if not, the program proceeds to a step S10.

[S7] The communication control section 10e retrieves the virtual IP address from the FIG. 8 data table.

[S8] The communication control section 10e retrieves the real IP address from the FIG. 8 data table.

[S9] The communication control section 10e notifies the router 31 of the retrieved virtual IP address and real IP address as routing information.

[S10] The communication control section 10e determines whether or not there exists a processor module as to which the routing notification has not been sent to the router 31 yet. If such an processor module exists, the program returns to the step S1 for repeatedly carrying out the same steps as described above, whereas if not, the program is terminated.

By carrying out the above-mentioned steps, the router 31 is informed of the virtual IP address or destination IP address assigned to each processor module together with the real IP address assigned to the same.

FIG. 10 illustrates an example of a data table representative of a network topology, which is formed in the router 31, by the above steps. The illustrated example shows correlation between destination IP addresses, gateway addresses, and metrics. For instance, the real IP address RIPA#1 (gateway address) corresponding to the processor module PM#1 is correlated with the virtual IP address VIPA#1 (destination IP address), and a metric (distance) between them is set to 2.

The real IP address RIPA#2 corresponding to the processor module PM#2 is correlated with the virtual IP address VIPA#1, and a metric (distance) therebetween is set to 2.

The real IP address RIPA#3 corresponding to the processor module PM#3 is correlated with the virtual IP address VIPA#2, and a metric (distance) therebetween is set to 2.

The real IP address RIPA#4 corresponding to the processor module PM#4 is correlated with the virtual IP address VIPA#2, and a metric (distance) therebetween is set to 2.

The router 31 carries out routing, by consulting the data table set as above. As a result, each virtual IP address appears to the communication opposite party as if it was an address of a remote network/host system located beyond a real IP address assigned to the multiple-processor information processing system 10.

As described above, according to the embodiment of the invention, the multiple-processor information processing system is configured such that virtual IP addresses are set on a processor-by-processor basis. This makes it possible to properly assign communication processes to the processors, on a processor-by-processor basis. Therefore, the processors can be selectively assigned with services according to the types of the services, whereby the services can be differentiated from each other.

Although in the above embodiment, the case of the information processing system having four processor modules is described by way of example, this is not limitative, but it goes without saying that the present invention can be applied to a case in which the information processing system has two or three processor modules, or five or more processor modules.

Further, although in the present embodiment, the communication sections 10e and 10f are formed as separate members, this is not limitative, but they may be integrated into a single section. Further, as mentioned above, the communication sections 10e and 10f may be incorporated in processor modules.

Furthermore, although in the present embodiment, virtual IP addresses are defined on a process module-by-processor module basis, this is not limitative, but processor modules may be defined on a virtual IP address-by-virtual IP address basis.

As described hereinabove, in the present invention, a multiple-processor information processing system including a plurality of processor modules comprises virtual IP address definition means for defining virtual IP addresses on a processor module-by-processor module basis, storage means for storing virtual IP addresses defined by the virtual IP address definition means and information indicative of ones of the processor modules corresponding to the virtual IP addresses, respectively, in a state correlated with each other, and notification means for notifying a router of a virtual IP address of each processor module and a real IP address of the each process module as routing information, for the each processor module having the virtual IP address stored in the storage means. Therefore, even when a predetermined communication process is overloaded, it is possible to reduce adverse influence of the overload on the other communication processes.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multiple-processor information processing system including a plurality of processor modules, the information processing system comprising:
   virtual IP address definition means for defining virtual IP addresses on a processor module or a plurality of processor modules;
   storage means for storing said virtual IP addresses defined by said virtual IP address definition means and information indicative of at least one real IP address of said processor modules corresponding to said virtual IP addresses, respectively, in a state correlated with each other; and
   notification means for notifying a router of said virtual IP address of each processor module and said real IP address of said each processor module as routing information, for said each processor module having said virtual IP address stored in said storage means,
   wherein said notification means notifies said router of a destination IP address of each processor module and said real IP address of said each processor module as routing information, for said each processor module having no corresponding virtual IP address stored in said storage means.

2. A recording medium readable by a multiple-processor information processing system including a plurality of processor modules, said recording medium storing a program for causing said multiple-processor information processing system to carry out a process for notification of routing information,
   said program causing said multiple-processor information processing system to function as:
   virtual IP address definition means for defining virtual IP addresses on a processor module or a plurality of processor modules;
   storage means for storing said virtual IP addresses defined by said virtual IP address definition means and information indicative of at least one real IP address of said processor modules corresponding to said virtual IP addresses, respectively, in a state correlated with each other; and
   notification means for notifying a router of said virtual IP address of each processor module and said real IP address of said each processor module as routing information, for said each processor module having said virtual IP address stored in said storage means,
   wherein said notification means notifies said router of a destination IP address of each processor module and said real IP address of said each processor module as routing information, for said each processor module having no corresponding virtual IP address stored in said storage means.

* * * * *